United States Patent [19]

Mahoney

[11] Patent Number: 4,977,991

[45] Date of Patent: Dec. 18, 1990

[54] MULTIPLE DISC CLUTCH

[75] Inventor: Pual E. Mahoney, Harrisville, R.I.

[73] Assignee: Delta Clutch, Inc., Providence, R.I.

[21] Appl. No.: 399,152

[22] Filed: Aug. 28, 1989

[51] Int. Cl.$^5$ .................. F16D 13/56; F16D 13/68
[52] U.S. Cl. ........................ 192/70.19; 192/70.27; 192/89 B
[58] Field of Search ............. 192/70.11, 70.12, 70.14, 192/70.16, 70.19, 70.27, 70.3, 99 A, 113 A, 89 B

[56] References Cited

U.S. PATENT DOCUMENTS

| | | | |
|---|---|---|---|
| 1,513,203 | 10/1924 | Wemp | 192/99 A XR |
| 1,554,394 | 9/1925 | White | 192/70.19 |
| 1,717,534 | 6/1929 | Wemp | 192/70.12 |
| 4,298,112 | 11/1981 | Carstensen | 192/99 A XR |
| 4,846,326 | 7/1989 | Tilton et al. | 192/70.19 |

Primary Examiner—Richard Lorence
Attorney, Agent, or Firm—St.Onge Steward Johnston & Reens

[57] ABSTRACT

A multiple disc clutch is provided for use with a source of torque. The clutch comprises interleaved first and second sets of friction discs mounted for rotation of one disc set relative to the other disc set about an axis, the disc sets being shiftable axially of each other; a flywheel plate for mounting in driving engagement to said source of torque; and a plurality of separately formed dowels for securing to said flywheel plate at circumferendowels for securing to said flywheel plate at circumferentially spaced locations, the dowels projecting axially therefrom through corresponding circumferentially spaced apertures adjacent the radially outward edge of the second disc set for driving engagement with said second disc set, the number and spacing of the dowels being chosen with respect to the circumference of the second disc set to promote air cooling of the multiple disc clutch by circulation of air around the dowels and between discs of the disc sets.

11 Claims, 5 Drawing Sheets

MULTIPLE DISC CLUTCH

FIELD OF THE INVENTION

The present invention relates to multiple disc clutches for coupling to a source of rotational kinetic energy. More specifically, an improved multiple disc clutch is provided having a plurality of circumferentially spaced, axially extending dowels that simplify assembly and promote air circulation throughout the structure for cooling and increased structural strength and torque capacity.

BACKGROUND OF THE INVENTION

Multiple disc clutches for engaging and disengaging coupled shafts during rotation are well known in the art. See, e.g., U.S. Pat. Nos. 1,886,865; 3,291,272; 3,317,013.

However, such prior art clutches are typically mechanically complex with complicated linkage mechanisms for accomplishing clutch engagement and disengagement. Also, prior art clutches usually require confined housings or other surrounding supporting structures that restrict optimum air flow around the various clutch parts, thereby limiting clutch life and efficiency by insufficient cooling and permitting buildup of unwanted heat.

SUMMARY OF THE PRESENT INVENTION

In accordance with one preferred embodiment of the present invention, a multiple disc clutch is provided, wherein a first set of circumferentially spaced dowels project axially from a flywheel plate in driving engagement through matching circumferentially spaced apertures in a radially outward edge of a driving disc set, which is interleaved with a separate driven disc set. The two disc sets are shiftable axially of each other either into or out of frictional driving engagement by means of a pressure plate assembly that produces an axially directed force for urging the disc sets together. The number, spacing, and diameter of these dowels are chosen with respect to the circumference of the driving disc set to promote air cooling by circulation of air around the dowels and between the discs of the disc set.

In accordance with a further preferred embodiment of the present invention, the force from the diaphragm is transmitted to the driving disc set for urging the driving and driven discs together by a second set of circumferentially spaced dowels slidably mounted in matching circumferential bores extending axially through a diaphragm plate on which the diaphragm is supported. The diaphragm comprises a radial array of springlike levers wherein each lever is pivotable about a fulcrum ring associated with said diaphragm plate for acting on said dowels.

It is an object of the present invention to provide an improved multiple disc clutch wherein air cooling of the discs is promoted and increased frictional surface is provided to improve engagement.

It is a further object of the present invention to provide an improved multiple disc clutch having a simplified linkage for urging the driving and the driven plates together.

Further objects and advantages of the present invention will become apparent from the following description of the drawings and the preferred embodiments.

DETAILED DESCRIPTION OF THE PREFERRED EMBODIMENT

Figure 1:
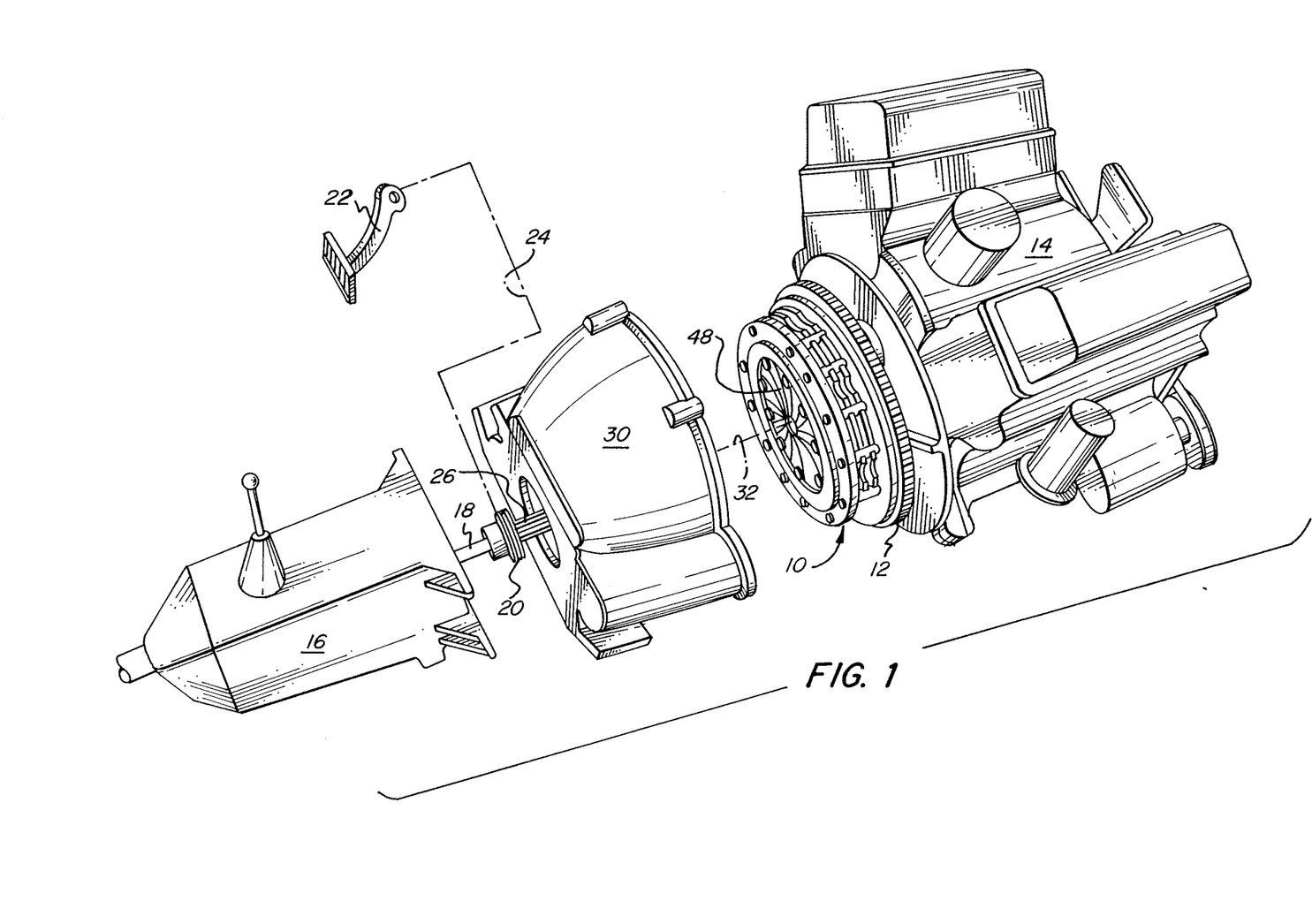
FIG. 1 is an isometric drawing of the improved multiple disc clutch assembly of the present invention shown mounted in a drive train.

With reference now to FIG. 1, the multiple disc clutch 10 of the present invention is shown mounted in a conventional fashion on flywheel 12 of a torque source such as internal combustion engine 14 for coupling and decoupling output torque from engine 14 to transmission 16 along transmission input shaft 18. Throwout bearing 20 is shifted by clutch pedal 22 through conventional linkage represented by broken line 24 along splined section 26 of shaft 18 to engage diaphragm 48 of clutch assembly 10 in a conventional fashion to couple or decouple the engine torque from transmission 16. Routine housing 30 encloses clutch assembly 10 and provides routine mounting of transmission 16 to engine 14 along the central axis indicated at 32.

Figure 2:
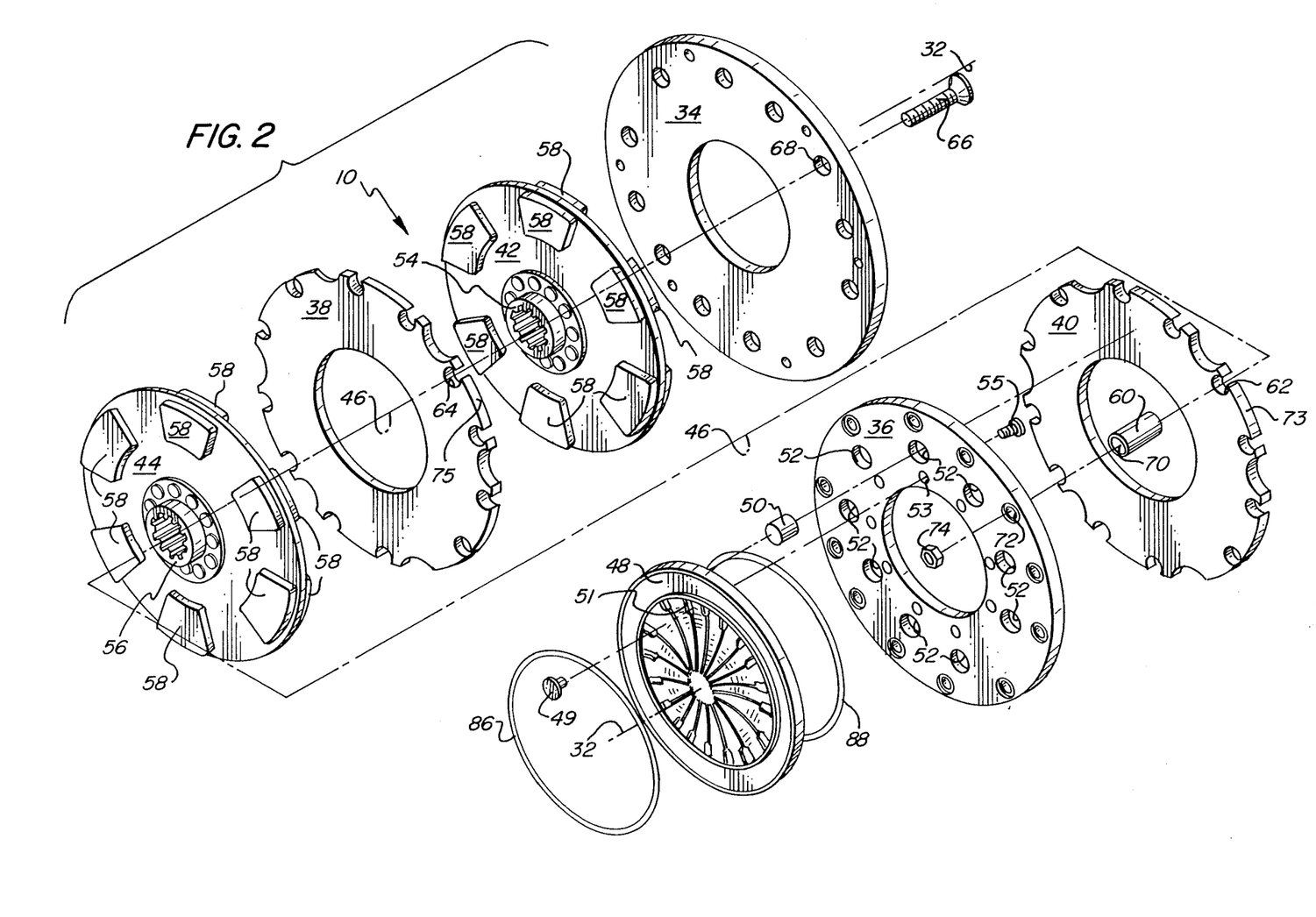
FIG. 2 is an exploded view of the clutch of FIG. 1.

FIG. 2 shows the details of the clutch construction of the present invention. A flywheel plate 34 for mounting to flywheel 12 in a conventional manner and a diaphragm plate 36 encompass therebetween a set of two driving discs or plates 38 and 40 as well as two driven discs or plates 42 and 44 interleaved together along central axis 32. Diaphragm 48 is mounted to diaphragm plate 36 by rivets such as shown at 49 and as will be further described below. Acting through a plurality of circumferentially spaced dowels such as indicated at 50 slidably mounted in matching bores such as at 52 in diaphragm plate 36, diaphragm 48 urges interleaved disc sets 40, 44, 38, and 42 together in frictional driving engagement. Driven discs 42 and 44 have splined hubs 54 and 56 for mounting on and driving shaft 18, as well as routine frictional facings 58 for engaging driving discs 38 and 40 as well as flywheel plate 34. The use of a diaphragm such as 48 to clamp discs 38, 40, 42, and 44 into driving engagement for clutch operation is well known in the art.

It is understood that the number of driving and driven discs in the multiple disc clutch can be routinely varied, and the diameters and thicknesses can also be varied within the skill in the art depending upon whether the application is heavy duty or otherwise. In the preferred embodiment, driving discs 38 and 40 are preferably formed of suitable material such as hot rolled pickled and oiled steel, cold rolled steel, cast steel, or cast iron with a typical diameter of about 13 inches and thickness of about 0.250 inches. Driven discs 42 and 44 are preferably formed of steel or other suitable material with a typical diameter of about 12 inches and a thickness of about 0.085 inches. Clutch facings 58 are of suitable material such as a ceramic, organic, or resin cloth. The flywheel plate 34 and diaphragm plate 36 are formed of hot rolled pickled and oiled steel, cold rolled steel, cast steel, or cast iron with a typical diameter of about 13 inches and a thickness of about 0.250 inches. The diaphragm 48 is formed from steel.

The present invention concerns the manner in which clutch 10 is assembled and also the manner in which axially directed diaphragm force is applied to the driving and driven discs 38, 40, 42, and 44.

First, with respect to clutch assembly, one of the plurality of assembly dowels is shown for simplicity's sake in FIG. 2 at 60. As indicated by assembly line 46, dowel 60 passes through an aperture 62 in driving disc 40 and through aperture 64 in the other driving disc 38 and is mounted in an axially extending direction onto flywheel plate 34 by threaded fastener 66 that passes through bolt hole 68 in flywheel plate 34, through a bore hole 70 in dowel 60, and through a hole 72 in diaphragm plate 36 to be secured thereto by nut 74. Riveting can be used as an alternative to conventional fastener 66 and nut 74. By using a plurality of circumferentially spaced dowels 60 extending circumferentially around the clutch assembly 10 as will be further described below, the flywheel plate 34 is drivingly engaged with driving discs 38 and 40 as well as diaphragm plate 36, such that when flywheel plate 34 is receiving torque from engine 14 so are the driving discs 38 and 40. However, dowel 60 is so sized with respect to apertures 62 and 64 that discs 38 and 40 are shiftable axially to either frictionally engage or disengage driven discs 42 and 44. It should also be noted as further described below that apertures 62 and 64 are placed far enough out on the periphery of discs 38 and 40 so as to be open to the edges 73 and 75 respectively of discs 40 and 38 for the purposes of enhancing cooling.

Figure 3:
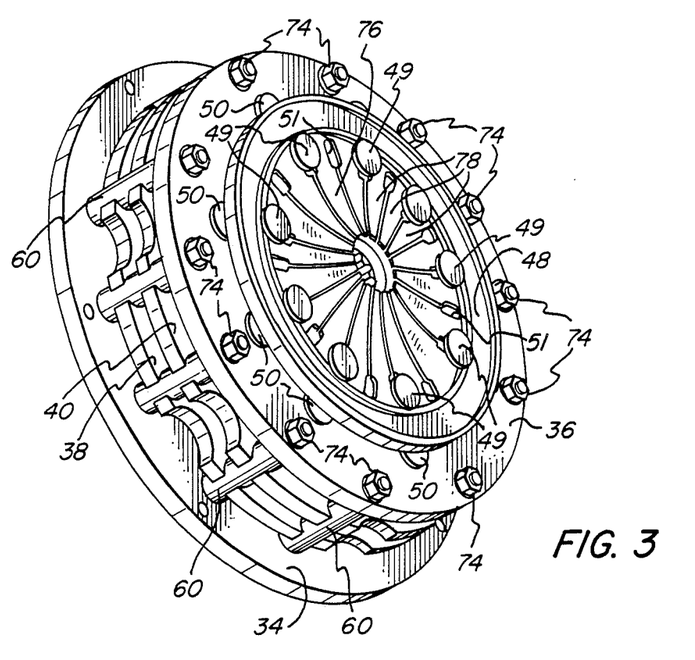
FIG. 3 is an isometric view of the clutch of FIG. 1.
Figures 4, 7:
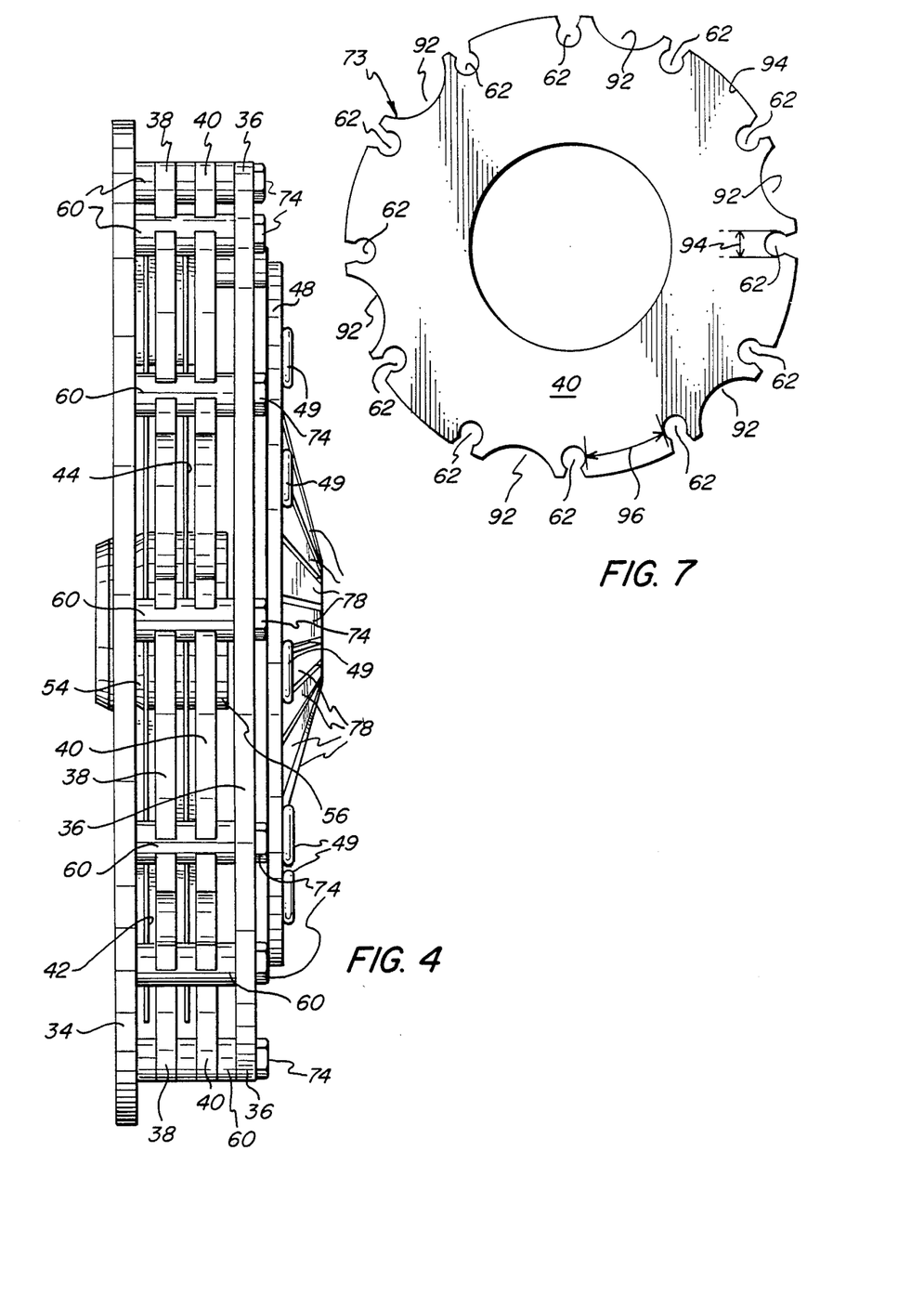
FIG. 4 is a side view of the clutch of FIG. 1.
FIG. 7 is a top view of one of the clutch plates of the present invention.

The assembled clutch 10 of the present invention is shown in isometric in FIG. 3 and side view in FIG. 4, wherein corresponding figure numbers from FIG. 2 refer to corresponding structure. Dowels 60 spaced around the circumference mount diaphragm plate 36 to flywheel plate 34 with driving discs 38 and 40 held in driving engagement therebetween. Diaphragm 48 is mounted to diaphragm plate 36 by rivets 49 passing through slots such as at 51 and aligned hole 53 in diaphragm plate 36 to cooperatively engage with matching fastener means 55 (see also FIG. 2).

With further reference to FIG. 3, it can be seen that diaphragm 48 has a conventional radial array 76 of springlike levers or fingers such as at 78 for providing a clamping force urging the driving discs 38, 40 into frictional driving face-to-face engagement with driven discs 42, 44.

Figure 5:
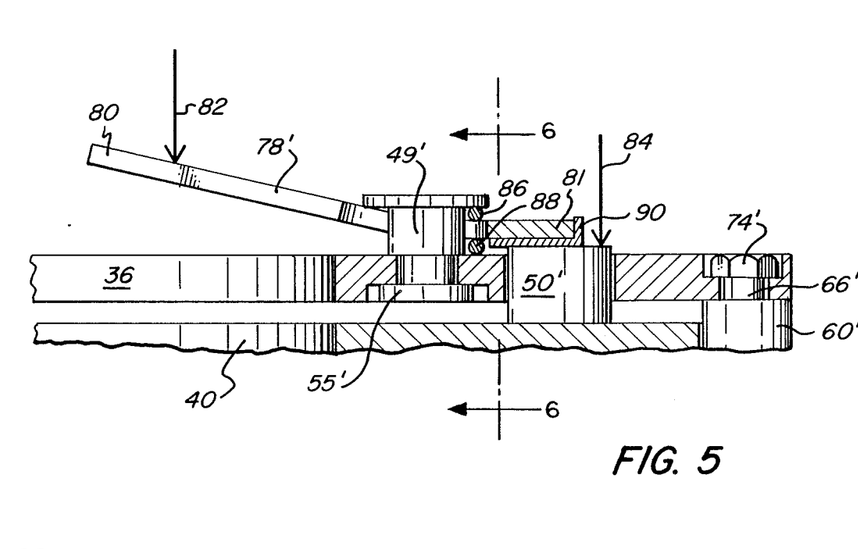
FIG. 5 is a side view of a further detail of the clutch of FIG. 1.
Figure 6:
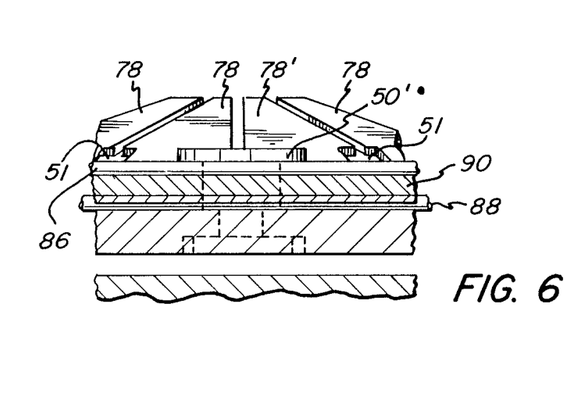
FIG. 6 is a cross-sectional view along lines 5—5 of FIG. 5.

The function of a diaphragm such as 48 is well known in the art; however, in accordance with the present invention, this clamping force is transmitted through circumferentially spaced dowels such as at 50 to axially shiftable driving discs 38, 40. FIGS. 5 and 6 show additional details of the manner in which the springlike fingers 78 of the diaphragm 48 are pivotable to apply an axially directed clamping force.

FIG. 5 shows a side view of one of a particular finger 78', while FIG. 6 shows an end view of the same structure.

Finger 78' has a first end portion 80 for being moved in the axial direction indicated by arrow 82 by the conventional action of throwout bearing 20 (not shown in FIG. 6, see FIG. 1). Finger 78' also has an opposing end portion 81 for acting in a leverlike fashion on interface ring 90 and dowel 50' as described below.

In the clutch engaged position, the finger 78' is biased by its springlike quality and shape to apply a clamping force indicated in the direction of arrow 84 through dowel 50' to urge disc 40 in an axial direction to force the stack of interleaved discs 40, 44, 38, 42, and 34 into frictional driving engagement. It is understood that this clamping force is accomplished by the sum total of the radial array 76 of fingers 78 acting on a plurality of circumferentially spaced dowels 50, of which FIG. 5 shows only one.

When the clutch 10 is to be disengaged, a force directed as shown by arrow 82 from throwout bearing 20 causes lever 78' to pivot about a fulcrum means such as circular rings 86 and 88 to reduce the force indicated at arrow 84 to a sufficiently low magnitude to permit the discs 40, 44, 38, and 42 to shift apart axially to eliminate the frictional face-to-face driving engagement. Dowels 50 such as 50' are preferably cylindrical and slidably mounted in cylindrical bores 52. Circular rings 86 and 88 extend circumferentially around the diaphragm plate 36. Annular shaped ring 90 simply provides an interface between end 81 of finger 78' and dowel 50'.

FIG. 7 shows a top view of driving disc 40, which is in all material respects identical to disc 38. Disc 40 has notches such as at 92 formed into the circumferential edge 73 of disc 40. Apertures 62 are also open to circumferential edge 73. Each aperture 62 has a diameter 94, and the apertures 62 are preferably evenly spaced circumferentially with the circumferential distance between adjacent apertures indicated at 96. The ratio of diameter 94, which is typically in the range of ⅝ to ¾ inches, to distance 96, which is typically in the range of 2 to 3 inches, is kept as low as reasonably possible.

It is understood that clutches built in accordance with the present invention may have a varying number of circumferentially spaced dowels without departing from the spirit of this invention.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A multiple disc dowel activated clutch for use in transmitting torque from a torque source to a torque destination, comprising:

a support plate affixed to and spaced apart from said torque source;

a plurality of fixed dowels axially extending between and secured to said support plate and said torque source;

a driving plate located adjacent said support plate between said support plate and said torque source, said driving plate being provided with a plurality of apertures around an outer perimeter thereof to axially slidably receive said fixed dowels and to thereby be in driving engagement with said torque source;

a driven plate located between said driving plate and said torque source, said driven plate being provided with a frictional facing on each side thereof and having means for engagement with the torque destination;

spring means affixed to said support plate, said spring means being operable to normally provide axial force toward said torque source and operable to release said axial force; and a plurality of activating dowels slidable in apertures in said support plate and being operable by said spring means to normally bear against said driving plate to slide said driving plate and said driven plate toward said torque source and thereby to place said driven plate in torque transmitting contact with said driving plate and said torque source, said activating dowels being slidable away from said driving plate to release said torque transmitting contact when said spring means is operated to release said axial force.

2. A multiple disc dowel activated clutch in accordance with claim 1, wherein said spring means comprise a diaphragm spring having a radial array of spring fingers having outer radial ends which provide the said axial force and which are fastened to said support plate by an array of fasteners radially inwardly of the outer radial ends, the array of fingers being pivotable about said array of fasteners, and an annular ring placed between said outer radial ends of said spring fingers and said support plate to bear against said activating dowels.

3. A multiple disc dowel activated clutch in accordance with claim 2, further comprising circular rings located on each side of said outer radial ends of said spring fingers for acting as a fulcrum for pivoting of said spring fingers.

4. A multiple disc dowel activated clutch in accordance with claim 1, wherein said apertures in said driving disc for receiving said fixed dowels are open to the perimeter edge of said driving disc.

5. A multiple disc dowel activated clutch in accordance with claim 1, further comprising:

a second driving plate located between said driven plate and said torque source, said second driving plate being provided with a plurality of apertures around an outer perimeter thereof to axially slidably receive said fixed dowels and to thereby be in driving engagement with said torque source;

a second driven plate located between said second driving plate and said torque source, said second driven plate being provided with a frictional facing on each side thereof and having and having means for engagement with the torque destination.

6. A multiple disc dowel activated clutch in accordance with claim 1, further comprising a flywheel plate affixed to said torque source and having a plurality of radially located apertures for receiving said plurality of fixed dowels extending between said support plate and said torque source.

7. A multiple disc dowel activated clutch for use in transmitting torque from a torque source to a torque destination, comprising:

a flywheel plate having means for fastening to the torque source;

a plurality of axially extending fixed dowels having fasteners therethrough affixed to an outer perimeter of said flywheel plate;

a diaphragm plate affixed to said fixed dowels and thereby to said flywheel plate at a distance therefrom, said dowels being affixed to an outer perimeter of said diaphragm plate;

a first driving plate located adjacent said diaphragm plate between said diaphragm plate and said flywheel plate, said first driving plate being provided with a plurality of apertures around an outer perimeter thereof to axially slidably receive said fixed dowels and to thereby be in driving engagement with said flywheel plate;

a first driven plate located between said first driving plate and said flywheel plate, said driven plate being provided with a frictional facing on each side thereof and having means for engagement with the torque destination;

a second driving plate located between said first driven plate and said flywheel plate, said second driving plate being provided with a plurality of apertures around an outer perimeter thereof to axially slidably receive said fixed dowels and to thereby be in driving engagement with said flywheel plate;

a second driven plate located between said second driving plate and said flywheel plate, said second driven plate being provided with a frictional facing on each side thereof and having an having means for engagement with the torque destination;

spring means affixed to said diaphragm plate, said spring means being operable to normally provide axial force toward said flywheel plate and operable to release said axially force; and a plurality of activating dowels slidably in apertures in said diaphragm plate and being operable by said spring means to normally bear against said first driving plate to slide said driving plates and said driven plates toward said flywheel plate and thereby to place said driven plates in torque transmitting contact with said driving plates and said flywheel plate, said activating dowels being slidable away from driving plate to release said torque transmitting contact when said spring means is operated to release said axial force.

8. A multiple disc dowel activated clutch in accordance with claim 7, wherein said spring means comprise a diaphragm spring having a radial array of spring fingers having outer radial ends which provide the said axial force and which are fastened to said diaphragm plate by an array of fasteners radially inwardly of the outer radial ends, the array of fingers being pivotable about said array of fasteners, and an annular ring placed between said outer radial ends of said spring fingers and said diaphragm plate to bear against said activating dowels.

9. A multiple disc dowel activated clutch in accordance with claim 8, further comprising circular rings located on each side of said outer radial ends of said spring fingers for acting as a fulcrum for pivoting of said spring fingers.

10. A multiple disc dowel activated clutch in accordance with claim 7, wherein said apertures in said driving discs for receiving said fixed dowels are open to the perimeter edge of said driving discs.

11. A multiple disc dowel activated clutch for use in transmitting torque from a torque source to a torque destination, comprising:

a flywheel plate having means for fastening to the torque source;

a plurality of axially extending fixed dowels having fasteners therethrough affixed to an outer perimeter of said flywheel plate;

a diaphragm plate affixed to said fixed dowels and thereby to said flywheel plate at a distance therefrom said fixed dowels being affixed to an outer perimeter of said diaphragm plate;

a first driving plate located adjacent said diaphragm plate between said diaphragm plate and said flywheel plate, said first driving plate being provided with a plurality of apertures around and open to an outer perimeter thereof to axially slidably receive said fixed dowels and to thereby be in driving engagement with said flywheel plate;

a first driven plate located between said first driving plate and said flywheel plate, said driven plate being provided with a frictional facing on each side thereof and having means for engagement with the torque destination;

a second driving plate located between said first driven plate and said flywheel plate, said second driving plate being provided with a plurality of apertures around and open to an outer perimeter thereof to axially slidably receive said fixed dowels and to thereby be in driving engagement with said flywheel plate;

a second driven plate located between said second driving plate and said flywheel plate, said second driven plate being provided with a frictional facing on each side thereof and having and having means for engagement with the torque destination;

a diaphragm spring affixed to said diaphragm plate and being operable to normally provide axial force toward said flywheel plate and operable to release said axial force, and having a radial array of spring fingers having outer radial ends which provide the aid axial force and which are fastened to said diaphragm plate by an array of fasteners radially inwardly of the outer radial ends, the array of fingers being pivotable about circular rings located on each side of said outer radial ends of said spring fingers, and an annular ring placed between said outer radial ends of said spring fingers and said diaphragm plate to bear against said activating dowels; and a plurality of metal activating dowels slidable in apertures in said diaphragm plate and being operable by said spring means to normally bear against said first driving plate to slide said driving plates and said driven plates toward said flywheel plate and thereby to place said driven plates in torque transmitting contact with said driving plates and said flywheel plate, said activating dowels being slidable away from said driving plate to release said torque transmitting contact when said spring means is operated to release said axial force.

* * * * *

UNITED STATES PATENT AND TRADEMARK OFFICE
CERTIFICATE OF CORRECTION

PATENT NO. : 4,977,991
DATED : December 18, 1990
INVENTOR(S) : Paul E. Mahoney

It is certified that error appears in the above—identified patent and that said Letters Patent is hereby corrected as shown below:

On the title page:

[75] Inventor: Pual E. Mahoney, Harrisville, R.I.

should read:

[75] Inventor: Paul E. Mahoney, Harrisville, R.I.

On the title page in the ABSTRACT [57]:

Delete: Line 8 as follows:
"for securing to said flywheel plate at circumferendow-"

Delete: first 3 letters of Line 9 as follows:

"els"

Signed and Sealed this

Seventh Day of July, 1992

Attest:

DOUGLAS B. COMER

Attesting Officer     Acting Commissioner of Patents and Trademarks